United States Patent
O'Neill et al.

(10) Patent No.: US 7,669,197 B1
(45) Date of Patent: Feb. 23, 2010

(54) EMBEDDED SYSTEM EMPLOYING COMPONENT ARCHITECTURE PLATFORM

(75) Inventors: Patrick O'Neill, Dana Point, CA (US); Bindu Rama Rao, Laguna Niguel, CA (US); Eugene Wang, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1100 days.

(21) Appl. No.: 10/654,149

(22) Filed: Sep. 3, 2003

Related U.S. Application Data (60) Provisional application No. 60/410,071, filed on Sep. 12, 2002.

(51) Int. Cl.
G06F 9/44 (2006.01)
G06F 9/45 (2006.01)

(52) U.S. Cl. .................. 717/172; 717/152; 717/173

(58) Field of Classification Search .................. None
See application file for complete search history.

(56) References Cited

U.S. PATENT DOCUMENTS

| | | | | |
|---|---|---|---|---|
| 5,261,055 A | 11/1993 | Moran et al. | ................. | 395/275 |
| 5,442,771 A | 8/1995 | Filepp et al. | ................. | 395/650 |
| 5,479,637 A | 12/1995 | Lisimaque et al. | .......... | 395/430 |
| 5,579,522 A | 11/1996 | Christeson et al. | .......... | 395/652 |
| 5,596,738 A | 1/1997 | Pope | ........................... | 395/430 |
| 5,598,534 A | 1/1997 | Haas | ...................... | 395/200.09 |
| 5,608,910 A | 3/1997 | Shimakura | .................. | 395/670 |
| 5,623,604 A | 4/1997 | Russell et al. | ............. | 395/200.1 |
| 5,666,293 A | 9/1997 | Metz et al. | ................. | 395/200.5 |
| 5,752,039 A | 5/1998 | Tanimura | .................... | 395/712 |
| 5,778,440 A | 7/1998 | Yiu et al. | .................... | 711/154 |
| 5,790,974 A | 8/1998 | Tognazzini | ................. | 701/204 |
| 5,878,256 A | 3/1999 | Bealkowski et al. | ........ | 395/652 |
| 5,960,445 A * | 9/1999 | Tamori et al. | ............... | 707/203 |
| 6,009,497 A | 12/1999 | Wells et al. | .................. | 711/103 |
| 6,038,636 A | 3/2000 | Brown, III et al. | .......... | 711/103 |
| 6,064,814 A | 5/2000 | Capriles et al. | ............. | 395/701 |
| 6,073,206 A | 6/2000 | Piwonka et al. | ............. | 711/102 |
| 6,073,214 A | 6/2000 | Fawcett | ...................... | 711/133 |
| 6,088,759 A | 7/2000 | Hasbun et al. | ............... | 711/103 |

(Continued)

FOREIGN PATENT DOCUMENTS

CA     2339923     3/2000

(Continued)

OTHER PUBLICATIONS

"Dynamic Software Updating", Hicks et al., Jun. 2001. Online retrieved at <citeseer.ist.psu.edu/336947.html>.*

(Continued)

*Primary Examiner*—Tuan Q Dam
*Assistant Examiner*—Thuy Dao (57) ABSTRACT

Disclosed herein is a component architecture platform (CAP) framework that provides a mechanism to update firmware, drivers, and/or application software in an embedded system, such as in mobile electronic devices. The framework also facilitates access to generated update packages by the embedded system and provides updates to firmware, drivers, content or application software in a fault tolerant mode. Generation of update packages is more efficient and the update packages employing CAP are more compact than prior solutions. A distributed version of CAP, (DCAP), also provides access to functionality or components located at remote locations on other platforms.

26 Claims, 3 Drawing Sheets

U.S. PATENT DOCUMENTS

| | | | |
|---|---|---|---|
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,317,872 B1 * | 11/2001 | Gee et al. | 717/152 |
| 6,360,362 B1 * | 3/2002 | Fichtner et al. | 717/168 |
| 6,438,585 B2 | 8/2002 | Mousseau et al. | 709/206 |
| 6,487,717 B1 * | 11/2002 | Brunemann et al. | 717/173 |
| 6,651,249 B2 * | 11/2003 | Waldin et al. | 717/170 |
| 6,990,660 B2 * | 1/2006 | Moshir et al. | 717/171 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2002/0174422 A1 * | 11/2002 | Kelley et al. | 717/178 |
| 2003/0033599 A1 | 2/2003 | Rajaram et al. | 717/173 |
| 2003/0037075 A1 | 2/2003 | Hannigan et al. | 707/500 |
| 2003/0131226 A1 * | 7/2003 | Spencer et al. | 713/100 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Low power DSP's for wireless communications (embedded tutorial session)", Verbauwhede et al., Aug. 2000, pp. 303-310. Onliner retrieved at <http://delivery.acm.org/10.1145/350000/344647/p303-verbauwhede.pdf>.*

"Low Power Embedded Software Optimization Using Symbolic Algebra", Peymandoust et al., Mar. 2002, pp. 1-7. Online retrieved at <http://delivery.acm.org/10.1145/880000/874358/14711052.pdf>.*

"Power optimization and management in embedded systems", M. Pedram, Jan. 2001, pp. 239-244. Online retrieved at <http://delivery.acm.org/10.1145/380000/370333/p239-pedram.pdf>.*

* cited by examiner

EMBEDDED SYSTEM EMPLOYING COMPONENT ARCHITECTURE PLATFORM

CROSS-REFERENCE TO RELATED APPLICATIONS/INCORPORATION BY REFERENCE

The present application claims the benefit of U.S. Provisional Application No. 60/410,071 filed on 12 Sep. 2002, which in turn claims the benefit of PCT Application having publication number WO/02/41147 A1, PCT number PCT/US01/44034, filed 19 Nov. 2001, which in turn claims the benefit of U.S. Provisional Application No. 60/249,606 filed 17 Nov. 2000, the complete subject matter of which are hereby incorporated herein by reference in their entirety.

The present application also incorporates herein by reference in its entirety, co-pending U.S. application Ser. No. 10/654,412, entitled "PROCESSING SYSTEM WITH COMPONENT ARCHITECTURE PLATFORM SUPPORT", filed 3 Sep. 2003.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embedded systems (i.e., mobile electronic devices having embedded software/firmware), for example, mobile cellular phones, personal digital assistants (PDA's), pagers, MP3 players, digital cameras, etc. often contain firmware and/or application software that are either provided by the manufacturers of the electronic devices, telecommunication carriers, or third parties. Such electronic devices are typically called embedded systems because the firmware and application software that they contain are typically embedded in silicon memory, such as FLASH. However, firmware and/or application software often contain software bugs. New versions of the firmware and software are periodically released to fix the bugs, introduce new features, or both.

A fundamental problem in providing access to new releases of firmware and software is that the embedded systems (electronic devices) are often constrained in terms of resources, such as available memory. Attempts to upgrade firmware or software by end-users often results in making the device, or some features of the device inoperable. Additionally, when changes to a firmware component, such as a driver, need to be made, there is no easy way to swap the old one out and put in a new one. Typically, the device has to be reflashed by a new FLASH image that is created by recompiling all or most of the code and/or rebuilding the image file. It can be seen that there is a need for an architecture where such recompilation or rebuilding is either made unnecessary or minimized and simplified.

When a new version of a driver or a function is to be introduced into embedded systems, all references to the old driver or function that occur in all other software/firmware sections have to be changed. Similarly, when a data item is shifted around in the memory of an embedded device, all references to that particular data item need to be updated. These are two very important issues which must be faced by embedded system designers.

In current embedded system technology, for example in mobile electronic devices, firmware is simply one big mass making it very hard to manipulate or update individual functions or sections independently. It can be seen that there is a need for a next generation architecture that enables updates of independent components within cell phones and other embedded systems.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a method and apparatus for designing modular components for software and firmware employed in embedded systems. Aspects of the present invention also provide a method and system for generating, distributing and applying update packages for modular, componentized firmware/software upgrades in embedded systems.

A method according to an embodiment of the present invention comprises a method for updating an embedded system. The method comprises generating update information adapted to modify the embedded system, disseminating the update information, and retrieving the update information. The method also comprises communicating the update information to the embedded system and updating the embedded system with the update information.

In another embodiment of the present invention, the method also comprises updating individual components independently in the embedded system.

In another embodiment of the present invention, the method also comprises creating an update package for delivery of update information. The update information is adapted to update at least one component of the embedded system.

In another embodiment of the present invention, disseminating the update information also comprises storing an update package in a distribution environment.

In another embodiment of the present invention, communicating the update information also comprises communicating a reference lookup table along with an update package to the embedded system.

In another embodiment of the present invention, the method also comprises locating an update agent in the embedded system. The update agent applies an update package to update the embedded system.

Another method in accordance with the present invention comprises a method of updating software in an electronic device. The method comprises generating a code module, compiling the code module into an object file, and linking the object file. The method also comprises generating a binary image file and executing the binary image. The method also comprises generating meta information and reference lookup information and creating an update package from the generated information.

In another embodiment of the present invention, the method also comprises distributing the update package to the electronic device to which the package corresponds.

In another embodiment of the present invention, the method also comprises generating a reference lookup table. The method also comprises mapping embedded system components in the table, mapping program modules in the table, mapping variable references in the table, and mapping addresses associated with embedded system components, program modules, and variable references in the table.

In another embodiment of the present invention, the method also comprises retrieving modification information from the reference lookup table corresponding to a particular modification event, generating a modification package with the modification information, and performing the modification event. The method also comprises updating entries in the table which correspond to the modification event.

In another embodiment of the present invention, the method also comprises updating entries in at least one of a local reference lookup table and a non-local reference lookup table.

A system in accordance with the present invention comprises a component architecture platform (CAP) network having an electronic device having an embedded system. The embedded system comprises an operating system, at least one application, a first distributed component architecture platform (DCAP) framework, and a software communication mechanism communicatively connecting the operating system, application, and the first DCAP.

In another embodiment of the present invention, the embedded system also comprises a wireless application protocol browser communicatively connected to the software communication mechanism.

In another embodiment of the present invention, the embedded system also comprises messaging software communicatively connected to the software communication mechanism.

In another embodiment of the present invention, individual components can be either replaced by a new version of the individual components or replaced by a reference to a remote version of the same.

In another embodiment of the present invention, the embedded system also comprises at least one of reference lookup table, non-volatile memory, and volatile memory.

In one embodiment, the electronic device is a mobile device. The CAP network also comprises a carrier network. The carrier network comprises a device application environment, a second distributed component architecture platform DCAP framework operatively coupled to the device application environment and a device proxy. The device proxy is communicatively coupled to the device application environment and manages commands and requests from the embedded system within the carrier network.

In another embodiment of the present invention, the CAP network also comprises a marshalling agent located within the embedded system. The marshalling agent marshalling and unmarshalling at least one of data, requests, and commands in the embedded system.

In another embodiment of the present invention, the device application environment is a distributed application environment. Applications are partitioned amongst available computing resources and managed by the carrier network in the distributed application environment. This permits independent modification of individual components in the embedded system.

In another embodiment of the present invention, the carrier network comprises a computer and the electronic device comprises a mobile cellular phone. The phone is adapted to receive information from the computer, send information to the computer, and execute program instructions therein.

In another embodiment of the present invention, the electronic device and the carrier network are bi-directionally communicatively connected via one of a wireless circuit, wireless packet, and wired connection.

In another embodiment of the present invention, the embedded system may also comprise chipsets. The chipsets maintain and manage at least one reference lookup table. The chipsets are provided with micro-coding to provide access to references during execution of code during program execution.

In another embodiment of the present invention, the embedded system may access resources of high performance network computers and terminals/(PCs) and may invoke a remote component upon determining that the high performance network computers and terminals/(PCs) is capable of executing the remote component more efficiently.

In another embodiment of the present invention, invoking a remote component may be initiated upon determining that a local power supply is providing power locally below a predetermined threshold, i.e., the battery supply is low.

In another embodiment of the present invention, the embedded system may invoke a remote component residing on a high performance network computer or terminal/(PC), even when an equivalent local component exists, upon determining that the high performance network computer or terminal/(PC) is capable of executing the remote component more efficiently.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE INVENTION

In the following description of the present invention, reference is made to the accompanying drawings which form a part hereof, and in which is shown by way of illustration an embodiment in which the invention may be practiced. It is to be understood that other embodiments may be utilized as structural changes may be made without departing from the scope of the invention.

Aspects of the present invention provide a method and apparatus for designing modular components for software and firmware employed in embedded systems. Aspects of the present invention also provide a method and system for generating, distributing and applying update packages for modular, componentized firmware/software upgrades in embedded systems, and wherein the individual components to be updated can either be replaced by a new version of the individual components or be replaced by a reference to a remote version of the same. The embedded system may access resources of high performance network computers and terminals/(PCs) and may invoke a remote component upon determining that the high performance network computers and terminals/(PCs) is capable of executing the remote component more efficiently. The embedded system may also invoke a remote component upon determining that a local power supply is providing power locally below a predetermined threshold, i.e., the battery supply is low. The embedded system may also invoke a remote component residing on a high performance network computer or terminal/(PC), even when an equivalent local component exists, upon determining that the high performance network computer or terminal/(PC) is capable of executing the remote component more efficiently.

Figure 1:
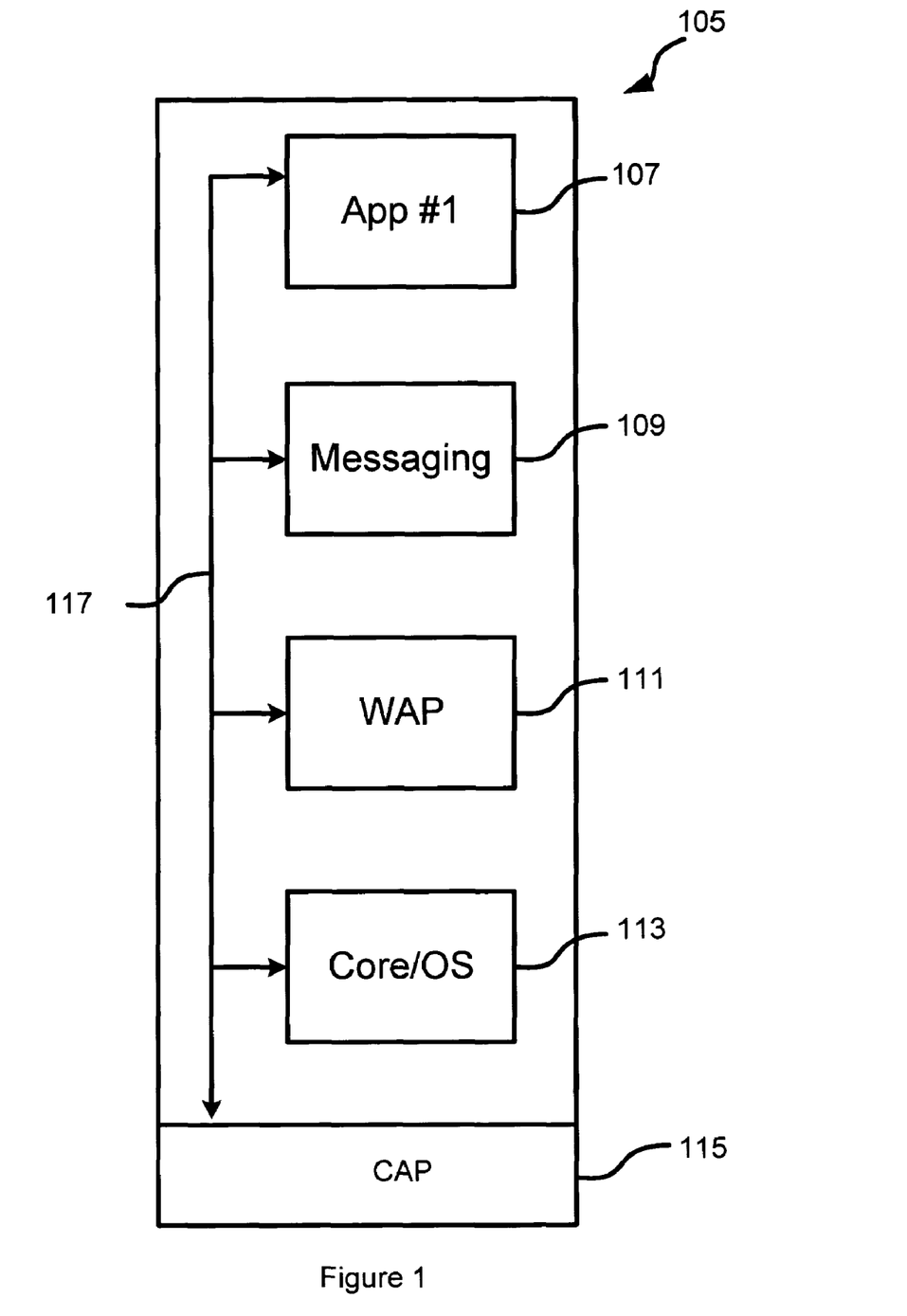
FIG. 1 illustrates a block diagram of an embedded system employing a component architecture platform (CAP) framework that facilitates easier updates of embedded system software, such as firmware, or applications in an electronic device (cellular phones, PDA's, and etc.) according to an embodiment of the present invention.

FIG. 1 illustrates a block diagram of an embedded system 105 employing component architecture platform (CAP) framework 115 that facilitates easier updates of embedded system software, such as firmware or applications 107, 109, 111, 113 in an electronic device (cellular phones, PDA'S, and etc.) according to an embodiment of the present invention. In FIG. 1, the embedded system 105 may comprise a CAP framework 115, a core software, such as firmware, and/or an operating system 113, a wireless application protocol (WAP) browser 111, a messaging software 109, at least one application 107, and a software communication mechanism 117. A component architecture platform supports replacement, addition, or deletion of software function, by using symbolic rather than physical memory addresses in program instructions. The symbolic addresses are resolved at runtime to physical memory addresses using a reference lookup table.

The resolution of symbolic addresses to physical memory addresses may be performed in a reference lookup table management unit. The reference lookup table management unit may provide to the associated processor the physical memory address corresponding to a symbolic address contained in a program instruction. The reference lookup table management unit may be implemented within a processor (hardware) or in code (software).

The embedded system 105 employing component architecture platform (CAP) framework may also comprise one or more reference lookup tables, non-volatile memory (such as FLASH), a volatile memory (such as RAM), and software resident in memory.

A feature of the embedded system 105 employing a component architecture platform (CAP) is dynamic module lookup, wherein a reference lookup table provides a level of indirection making it possible to change a component and make it instantly available to consumers by simply updating the value associated with the component reference in the reference lookup table.

The embedded system 105 in the electronic device is capable of updating its corresponding firmware or software with the assistance of a CAP-aware update environment. The CAP-aware update environment in an embedded system can upgrade its firmware from one version to another by retrieving an update package from an application distribution environment. The update package may be generated employing a CAP-aware generation environment. The individual components to be updated may either be replaced by a new version of the individual components or may be replaced by a reference to a remote version of the same. The embedded system may access resources of high performance network computers and terminals/(PCs) and may invoke a remote component upon determining that the high performance network computers and terminals/(PCs) is capable of executing the remote component more efficiently. The embedded system may also invoke a remote component upon determining that a local power supply is providing power locally below a predetermined threshold, i.e., the battery supply is low. The embedded system may also invoke a remote component residing on a high performance network computer or terminal/(PC), even when an equivalent local component exists, upon determining that the high performance network computer or terminal/(PC) is capable of executing the remote component more efficiently.

In embedded system technology, such as in mobile electronic devices, firmware is frequently simply one big mass making it very hard to manipulate or update individual functions or sections independently. It can be seen that there is a need for a next generation architecture that enables updates of independent components within mobile electronic devices having embedded systems. The CAP framework permits functionality to be componentized in mobile electronic devices and enables components to work together, but be updated independently. The CAP architecture may be considered to be analogous to an embedded-grade COM (Component Object Model) enabling functional units to be organized into components (CAP components) that may be individually modified. These CAP components may be in some ways similar to ActiveX-like components. However, Active-X or COM is too bulky and cumbersome to perform the updates effectively, while the CAP framework is architected for speed, efficiency, and conciseness. These components may be functional units or sub-portions of functional units, such as codecs, messaging clients, browsers, Java virtual machines, or native applications. Unlike previous solutions, when employing the CAP architecture, changes are constrained to within a component's region, thus providing unlimited dynamic device extensibility.

Several advantages may be realized by utilization of the CAP architecture, some of which are enumerated below:

The CAP framework facilitates components being easily updated without impacting the rest of the system;

The CAP framework facilitates components being safely locked down and prevents updates to certain critical sections of the system, increasing the quality of the update;

Update packages may be created much smaller because only those components that are being modified need to be processed by the update package;

The CAP framework enables separate and independent updating of components from various technology vendors, being heretofore impossible, increasing the speed of updates to market;

The CAP framework promotes reusability and increases the useful life of the electronic device;

The CAP framework enables dividing firmware/software into an unlimited number of core components and expansion components;

Existing operating systems, such as the operating system distributed by the Symbian® Limited, are able to take advantage of the CAP framework (i.e., the CAP framework is independent of the operating system being used);

The CAP framework provides an architecture framework to componentize functionality within a device; and The CAP framework extends customization potential of embedded systems in devices such as mobile electronic devices, while simplifying application management. For example, new applications may be added to a mobile electronic device, and/or existing software/firmware may be upgraded. The individual components to be updated may either be replaced by a new version of the individual components or may be replaced by a reference to a remote version of the same. The embedded system may access resources of high performance network computers and terminals/(PCs) and may invoke a remote component upon determining that the high performance network computers and terminals/(PCs) is capable of executing the remote component more efficiently. The embedded system may also invoke a remote component upon determining that a local power supply is providing power locally below a predetermined threshold, i.e., the battery supply is low. The embedded system may also invoke a remote component residing on a high performance network computer or terminal/(PC), even when an equivalent local component exists, upon determining that the high performance network computer or terminal/(PC) is capable of executing the remote component more efficiently.

Aspects of the present invention also provide management tools for manufacturers to produce different versions of software for the mobile electronic device market. Thus, a manufacturer may embed different versions of software in a given mobile electronic device and market them differently, such as a business version, an entertainment version, and a mobile office version within a given mobile electronic device, wherein the device's instant version may be changed by an end-user. Telecommunications carriers may easily deliver these different feature sets and end-users may quickly choose a particular version in a simple fashion. Thus, customization may occur both pre- and post-sale enhancing the mobile electronic device market.

The CAP framework also facilitates customization of the embedded systems in mobile electronic devices. Several benefits may be obtained by the ability to customize mobile electronic device services. With appropriate interfaces to billing systems, the CAP framework enables a carrier to charge for new features and services. The employment of the CAP architecture in mobile electronic devices boosts average revenue per user (ARPU) with flexible business models for the carriers. In addition, the CAP architecture makes it possible to easily enable application subscriptions such as, for example "game of the month". Applications may use the full capability of hardware/software by applying updates to the firmware/software. Such updates are likely to be safer because fewer bytes are changed, and the scope of the updates are restricted to only those associated with components needing changed.

Figure 2:
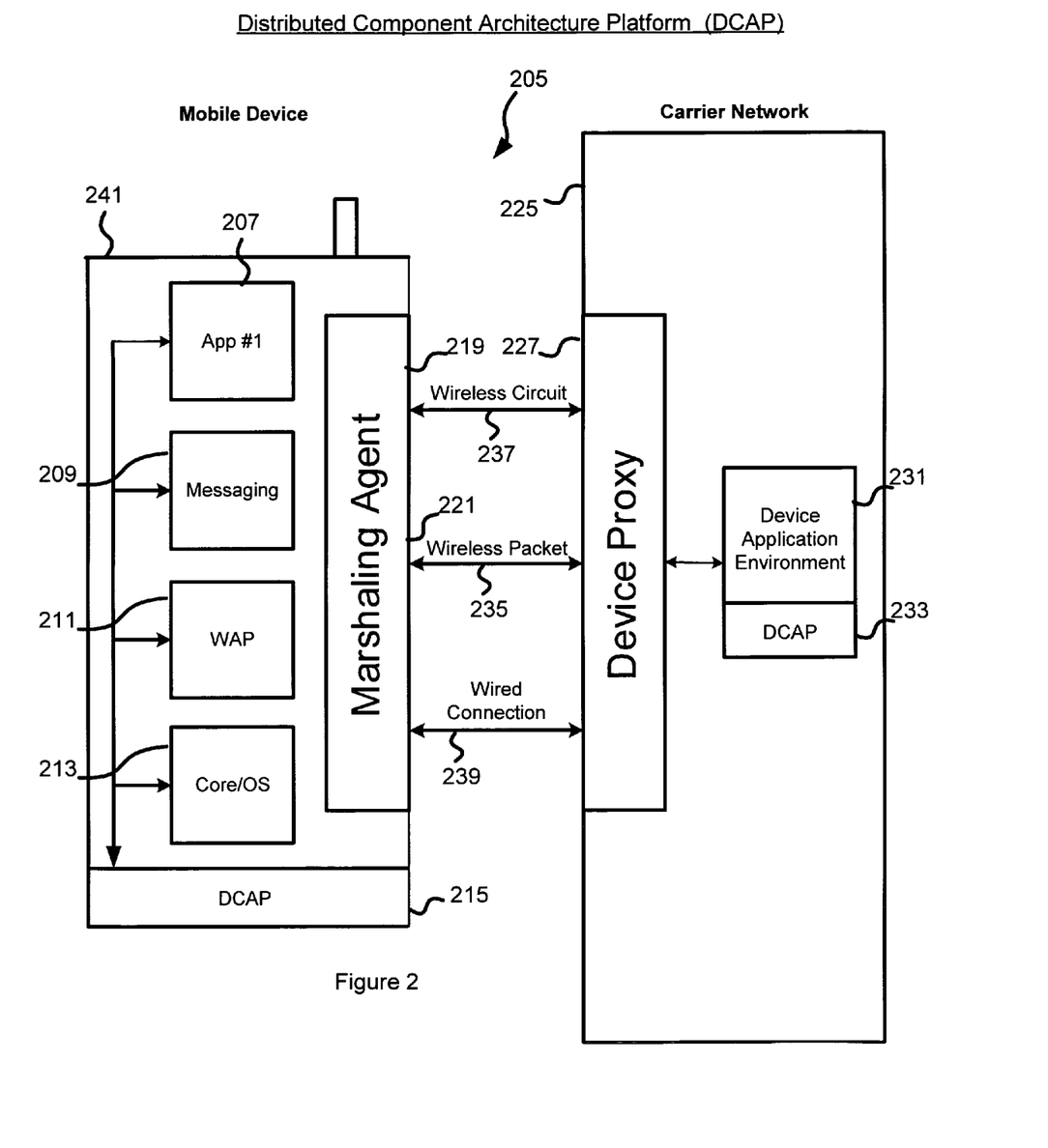
FIG. 2 illustrates a block diagram of a CAP network that facilitates access to remote functionality between an embedded system, such as a mobile device, and a device application environment managed by a carrier network according to another embodiment of the present invention.

FIG. 2 illustrates a block diagram of a CAP network 205 that facilitates access to remote functionality between a mobile electronic device 241 and a device application environment 231 managed by a carrier network 225 according to an embodiment of the present invention. FIG. 2 also illustrates that the CAP network 205 may comprise a mobile electronic device 241, a device application environment 231 managed by carrier network 225, and a device proxy 227 communicatively coupled to the device application environment 231, wherein the device proxy 227 manages commands and requests on behalf of the mobile electronic device 241 within the carrier network 225.

The CAP network 205 may also comprise a marshalling agent 219 within the mobile electronic device 241 that facilitates marshalling and unmarshalling of data, requests, commands, and etc. at the embedded system end, a first DCAP framework instance 215 in the mobile electronic device 241 and another corresponding second DCAP framework instance 233 in the device application environment 231.

The mobile electronic device 241 employing the DCAP framework 215 also facilitates higher quality updates of embedded system software, such as firmware or applications 207, 209, 211, and 213 in mobile electronic devices.

In an embodiment of the present invention, the mobile electronic device 241 may employ the distributed version of the CAP framework, DCAP 215, to provide bi-directional connectivity and access to remotely located components, such as components managed by the device application environment 231. The DCAP 215 enables a new generation of distributed applications and services to be efficiently partitioned amongst available computing resources. Ultra-tiny native applications may be delivered to mobile electronic devices via the carrier network 225, and also in general, by a distributed environment, such as the mProve distributed environment by Bitfone Corporation. In such an arrangement, the bulk of the functionality may reside on servers managed by the carrier network. A distributed environment, if one is employed, may be located in the carrier network. Communication between the mobile electronic device 241 and the carrier network 225 may be facilitated by employing one of several available communication mechanisms, such as wireless circuit 237, wireless packet network 235, or wired connection 239.

The DCAP's (215, 233) enable execution of code on non-native platforms seemingly as if it were native to the mobile electronic device 241. For example, by connecting an embedded system in a mobile electronic device having DCAP to a PC, the mobile electronic device may be enabled to execute software therein. Consequently, software/firmware content may be moved between a mobile electronic device and a PC. For example, the PC/mobile electronic device connection may be enabled to drag and drop content from Microsoft Outlook®, for example, into a DCAP-based mobile electronic device. In another embodiment, the embedded system may be converted into a remote control device employing the DCAP.

In general, by creating generic CAP/DCAP-based agents having pre-defined functionality and interfaces, the devices provide greater compatibility across multiple services and service providers. There are many benefits of the DCAP framework including the ability of mobile electronic devices to tap in to resources of high performance network computers and PC's, and the ability to create new opportunities for more powerful embedded mobile electronic device-based services.

In another embodiment of the present invention, a generation environment employing a generator is adapted to capture information about starting addresses and symbolic names of various functions, modules, and references, and to load information into a reference lookup table. When an update package is created, only code for specific modules, functions, or components being updated or modified, is employed to generate the update package. The generated update package may then be communicated to the mobile electronic device when the device is to be upgraded to a different version of firmware/software. Additionally, a reference lookup table may be communicated to the mobile electronic device as part of an update package. The mobile electronic device may employ a local reference lookup table and/or a received reference lookup table to apply an update package.

Figure 3A:
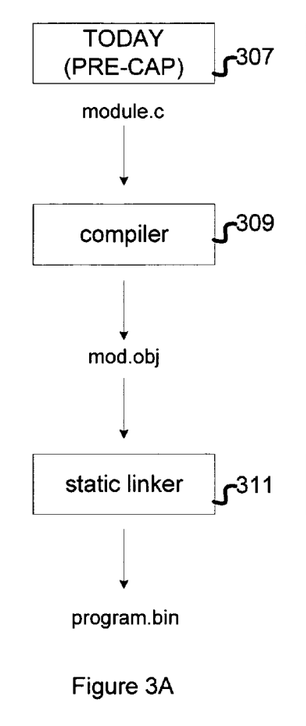
FIG. 3A illustrates a flow diagram of a compiler process employed according to another embodiment of the present invention.

FIG. 3A illustrates a flow diagram of a compiler process according to another embodiment of the present invention. In FIG. 3A, at block 307, a code module, module.c, is created. At the next block 309, the compiler is invoked to compile the code module, module.c, into an object file, mod.obj. At the next block 311, a static linker processes the object file, mod.obj, to produce (or save) a binary image of the software in a binary image file, program.bin. Typically, the binary image may be executed by a processor in an embedded system.

Figure 3B:
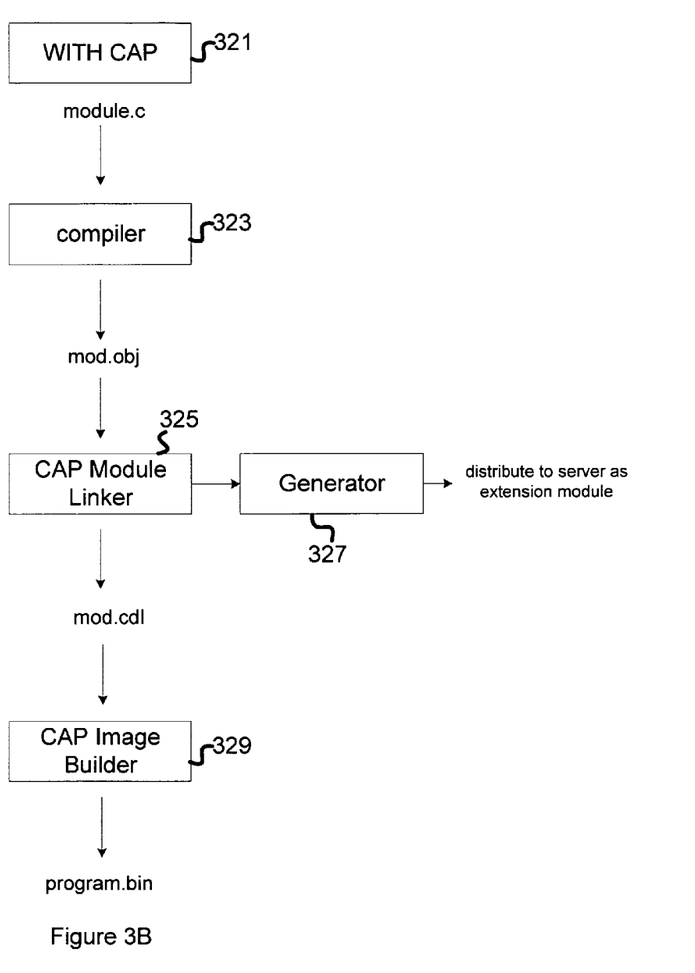
FIG. 3B illustrates a flow diagram showing a compiler process employed by a CAP framework supporting a CAP/DCAP environment according to another embodiment of the present invention.

FIG. 3B illustrates a flow diagram of another compiler process employed by the CAP framework that supports a CAP/DCAP environment according to an embodiment of the present invention. In FIG. 3B, at block 321, a code module, module.c, is created. At the next block 323, a compiler is invoked to compile the code module, module.c, into an object file, mob.obj. At the next block 325, a CAP module linker may be employed to produce meta information and reference lookup information that may be provided to a generator, such as an mProve Generator from Bitfone Corporation, at a next block 327 for generation of an appropriate update package. At block 325, the CAP module linker may also generate a file, mod.cdl, that may be subsequently employed by CAP image builder at a block 329 to generate a binary image file, program.bin. The generator may generate an extension module that may be distributed to a server, such as an mProve server from Bitfone Corporation, as an extension module to be communicated to mobile electronic devices.

In another embodiment, an extension module generated may be a reference lookup table for an embedded system. The embedded system may maintain a reference lookup table that not only saves and maps references of functions, modules, components, and etc. to associated address(es) (physical or symbolic, absolute or relative), but also saves/manages mapping of variable references (automatic variables, global variables, and etc.) t corresponding address(es). When a module/component/function is to be updated in an embedded system, an update package may be retrieved from, for example, a server in a carrier network that contains code/data/information regarding updating the module/component/function to a different version. The update package may be applied by an update agent located in the embedded system resulting in generation of a new version of the module/component/function. Update of software/firmware in a mobile electronic device may also be facilitated by an update agent in the embedded system.

In another embodiment, a process of applying an update package by an update agent in an embedded system involves removing code and data of modules/components to be upgraded, generating code and data for a new version of a module/component, inserting code and data for the new version in memory (volatile or non-volatile), and updating entries in a reference lookup table for references to modules/components/functions, etc. In general, it may be assumed that invocation of branch-link instructions, jump commands, subroutine calls, etc. are preceded by a lookup of an address from the reference lookup table.

In another embodiment, a process of loading a new module/function/component into an image of an embedded system (located in FLASH memory) may be accompanied by activities to update a reference lookup table with appropriate values for addresses of new or modified functions/components/modules, and etc.

In another embodiment, every module/component/function may maintain a local reference lookup table that provides mapping of local (internal) variables, functions, and methods. When a new module is inserted into an embedded system, the local reference lookup table may also be inserted. Subsequent modifications to the module may be accompanied by changes to the local reference lookup table, in addition to updates to an (overall) reference lookup table that maintains non-local reference lookup information.

In another embodiment of the present invention, an embedded system may employ chipsets that facilitate maintenance and management of reference lookup tables. The chipsets may employ micro-coding techniques to implement reference table lookups, reference table management, and access to references during execution of code at runtime. The compilers used to compile applications may generate binary or hex output for compiled code to create entries in the reference lookup tables and also otherwise manipulate the tables.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. A method for updating an embedded system comprising components, the method comprising:
generating update information adapted to modify the embedded system, wherein at least one processor in the embedded system executes program instructions for which symbolic references rather than physical memory addresses are used to execute the program instructions;
disseminating the update information;
retrieving the update information;
communicating the update information to the embedded system;
updating the embedded system with the update information; and
the embedded system accesses resources of high performance network computers and terminals/(PCs) and invokes a remote component upon determining that the high performance network computers and terminals/(PCs) can execute the remote component more efficiently, wherein invoking the remote component is initiated upon determining that a local power supply is providing power locally below a predetermined threshold.

2. The method according to claim 1, further comprising updating individual components independently in the embedded system.

3. The method according to claim 1 wherein updating comprises updating individual components without impacting the rest of the embedded system.

4. The method according to claim 1, further comprising safely locking down and preventing updates to certain critical sections of the system to increase update quality.

5. The method according to claim 1, further comprising dividing firmware/software into a plurality of core components and expansion components wherein the expansion components are uploaded as necessary and the core components are shared.

6. The method according to claim 1, further comprising creating an update package for delivery of update information, wherein the update information is adapted to update at least one component of the embedded system.

7. The method according to claim 1, wherein disseminating the update information further comprises storing an update package in a distribution environment.

8. The method according to claim 1, wherein communicating the update information further comprises communicating a reference lookup table along with an update package to the embedded system.

9. The method according to claim 1, further comprising locating an update agent in the embedded system, wherein the update agent applies an update package to update the embedded system.

10. A method of updating software in an electronic device comprising:
generating update information, wherein the update information comprises at least one of meta information, reference lookup information, and a reference lookup table, and wherein at least one processor in the electronic device executes program instructions for which symbolic references rather than physical memory addresses are used to execute the program instructions;
creating an update package from the generated update information;
communicating the update package to the electronic device;
updating the electronic device with the update package; and
the electronic device accesses resources of high performance network computers and terminals/(PCs) and invokes a remote component upon determining that the high performance network computers and terminals/(PCs) can execute the remote component more efficiently, wherein invoking the remote component is initiated upon determining that a local power supply is providing power locally below a predetermined threshold.

11. The method according to claim 10, further comprising distributing the update package to the electronic device to which the update package corresponds.

12. The method according to claim 10, further comprising:
mapping at least one of embedded system components, program modules, and variable references, and addresses associated with the at least one of embedded system components, program modules, and variable references in the reference lookup table.

13. The method according to claim 12, further comprising:
retrieving modification information corresponding to a modification event;
generating at least one modification module containing the modification information;
performing the modification event; and
updating entries in the reference lookup table which correspond to the modification event.

14. The method according to claim 13, further comprising:
updating entries in at least one of a local reference lookup table and a non-local reference lookup table.

15. A component architecture platform (CAP) network including an electronic device having an embedded system, the embedded system comprising:
at least one processor operable to execute program instructions for which symbolic references rather than physical memory addresses are used to execute the program instructions;
an operating system;
at least one application comprising a plurality of software components employing symbolic references for execution of software instructions;
a first distributed component architecture platform (DCAP) framework;
a software communication mechanism communicatively connecting the operating system, the at least one application, and the first DCAP;
generating update information adapted to modify the embedded system;
communicating the update information to the embedded system;
updating the embedded system with the update information; and
the embedded system accesses resources of high performance network computers and terminals/(PCs) and invokes a remote component upon determining that the high performance network computers and terminals/(PCs) can execute the remote component more efficiently, wherein invoking the remote component is initiated upon determining that a local power supply is providing power locally below a predetermined threshold.

16. The CAP network according to claim 15, wherein the embedded system further comprises a wireless application protocol browser communicatively coupled to the software communication mechanism.

17. The CAP network according to claim 15, wherein the embedded system further comprises messaging software communicatively coupled to the software communication mechanism.

18. The CAP network according to claim 15, wherein individual components can be either replaced by a new version of the individual components or replaced by a reference to a remote version of the same.

19. The CAP network according to claim 15, wherein the embedded system further comprises at least one of reference lookup tables, non-volatile memory, and volatile memory.

20. The CAP network according to claim 15, wherein the CAP network further comprises a carrier network, the carrier network comprising:
a device application environment;
a second distributed component architecture platform DCAP framework operatively coupled to the device application environment; and
a device proxy, wherein the device proxy is communicatively coupled to the device application environment and manages commands and requests from the embedded system within the carrier network.

21. The CAP network according to claim 20, further comprising a marshalling agent located within the embedded system, the marshalling agent marshalling and unmarshalling at least one of data, requests, and commands in the embedded system.

22. The CAP network according to claim 20, wherein the device application environment is a distributed application environment, wherein applications are partitioned amongst available computing resources and managed by the carrier network in the distributed application environment permitting independent modification of individual components in the embedded system.

23. The CAP network according to claim 22, wherein the carrier network comprises a remote computer and the electronic device comprises a mobile cellular phone, wherein the phone is adapted to receive information from the computer, send information to the computer, and execute program instructions remotely therein.

24. The CAP network according to claim 20, wherein the electronic device and the carrier network are bi-directionally communicatively coupled via one of a wireless circuit, wireless packet, and wired connection.

25. The CAP network according to claim 15, wherein the embedded system further comprises chipsets, wherein the chipsets maintain and manage at least one reference lookup table, and the chipsets are provided with micro-coding to provide access to references concurrent with program execution.

26. The CAP network according to claim 15, wherein the embedded system invokes a remote component on a high performance network computer or terminal/PC even when an equivalent local component exists upon determining that the high performance network computer or terminal/PC can execute the remote component more efficiently.

* * * * *